(12) United States Patent
Yamamoto et al.

(10) Patent No.: US 6,527,077 B2
(45) Date of Patent: Mar. 4, 2003

(54) BODY INCLINE SENSOR FOR A MOTORCYCLE

(75) Inventors: Takao Yamamoto, Saitama (JP); Naoki Murasawa, Saitama (JP); Masao Akieda, Saitama (JP); Koichi Shimamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/933,952

(22) Filed: Aug. 22, 2001

(65) Prior Publication Data

US 2002/0027037 A1 Mar. 7, 2002

(30) Foreign Application Priority Data

Sep. 1, 2000 (JP) .......................................... 2000-265299

(51) Int. Cl.[7] .......................... B60K 28/14; H01H 35/00
(52) U.S. Cl. ...................... 180/283; 180/220; 307/9.1; 307/121; 200/61.52; 340/440
(58) Field of Search ................................ 180/283, 284, 180/285, 286, 218, 223, 282, 220; 340/438, 286.01, 440; 200/61.52

(56) References Cited

U.S. PATENT DOCUMENTS

| 3,564,171 | A | * | 2/1971 | Hammond ............... 200/61.52 |
| 3,772,643 | A | * | 11/1973 | Dodd et al. .................. 340/440 |
| 3,882,957 | A | * | 5/1975 | Fritz ........................... 180/284 |
| 3,889,774 | A | * | 6/1975 | Schwenk ..................... 180/283 |
| 4,278,854 | A | * | 7/1981 | Krause ....................... 200/52 A |
| 4,866,379 | A | * | 9/1989 | Odagawa et al. ...... 324/207.12 |
| 4,972,595 | A | * | 11/1990 | Shimamura et al. ..... 33/366.23 |
| 5,283,402 | A | * | 2/1994 | Green ................... 200/61.45 R |
| 5,613,571 | A | * | 3/1997 | Rank et al. .................. 180/282 |
| 5,955,714 | A | * | 9/1999 | Reneau ..................... 200/61.52 |
| 5,983,724 | A | * | 11/1999 | Yoshida ....................... 73/652 |

FOREIGN PATENT DOCUMENTS

| JP | 11337332 | | 12/1999 |
| JP | 2000-65568 | * | 3/2000 |

* cited by examiner

*Primary Examiner*—Paul N. Dickson
*Assistant Examiner*—Laura B. Rosenberg
(74) *Attorney, Agent, or Firm*—Birch, Stewart, Kolasch & Birch, LLP

(57) ABSTRACT

A body incline sensor includes an erroneous detection preventing circuit for transmitting an inclined state signal by determining that a body is in an inclined state when an incline angle detector detects a weight, and a state so detected continues over a predetermined length of time. In the event that the incline angle detector does not detect a weight within a predetermined length of time due to an inertia force resulting when a body is rolling, no inclined state signal is transmitted from an inclined state transmitter, whereby the erroneous detection of the incline of the body can be prevented, the accuracy with which the incline of the body is detected being thus improved. In addition, in the event that the incline angle detector is constituted by the weight and magnets mounted on the weight and reed switches adapted to be switched on by the magnets, and in the event that the inclined state transmitter is constituted by a simple electric circuit, the production costs of the body incline sensor can be suppressed.

23 Claims, 8 Drawing Sheets rolling over vertical standing

BODY INCLINE SENSOR FOR A MOTORCYCLE

BACKGROUND OF THE INVENTION

The present invention claims the benefit of Japanese Patent Application No. 2000-265299, filed Sep. 1, 2000, the entirety of which is hereby incorporated by reference.

1. Field of the Invention

The present invention relates to a body incline sensor for a motorcycle. In particular, the present invention relates to a body incline sensor for a motorcycle, which can improve the accuracy with which the incline angle of the body of the motorcycle is detected. Accordingly, the production costs of the motorcycle can be suppressed.

2. Description of Background Art

An "Incline Sensor" has been disclosed, for example, in JP-A-11-337332 and is known as an incline sensor for detecting the incline of the body of a motorcycle.

Illustrated in FIGS. 2 and 3 of the aforesaid unexamined patent publication is an incline sensor in which an aluminum weight 5 is mounted on a disc-like substrate 1 in such a manner as to freely swing. A notched portion 5c is formed in the weight 5, a photo-sensor 8 is disposed so as to face the notched portion 5c. Furthermore, a magnet 4 is mounted on the substrate 1.

In a case where the weight 5 and the magnet 4 swing relatively to each other, since the weight 5 cuts through a magnetic field formed by the magnet 4, an eddy current is generated in the weight 5. This causes the motion of the weight 5 to be suppressed.

In addition, in a case where the body is inclined and the photo-sensor 8 moves relative to the weight 5 such that it goes out of the notched portion 5c, since the surface of the weight 5 is imparted with a high reflection factor, since the photo-sensor 8 faces the surface of the weight 5, it detects reflected light to thereby detect that the body is inclined.

Normally, even when the magnet 4 is inclined together with the body, an eddy current is generated in the weight 5 through the relative rotation of the magnet 4 and the weight 5. Furthermore, the weight 5 is also inclined slightly as the magnet 4 is inclined, the weight 5 then gradually returning to its original position.

In a case where the body is suddenly inclined at a speed equal to or faster than a predetermined speed, even if an operation to restore the body to its neutral position follows that, the weight 5 continues to be inclined in an originally inclined direction due to an inertia force acting on the weight 5. Furthermore, the photo-sensor 8 deviates from the notched portion 5c in the weight 5 and detects the reflected light. In this case, an accurate detection of the incline of the body may become difficult.

Additionally, since a number of man-hours are required to form the weight 5 in which the notched portion 5c is formed and the magnet 4 which is formed into a doughnut shape, an increase in production cost is required.

SUMMARY OF THE INVENTION

In a body incline sensor for a motorcycle, an object of the present invention resides in improvement of the accuracy with which the incline of the body is detected, as well as suppression of increase in the production costs.

With a view to attaining the above object, according to a first aspect of the present invention, there is provided a body incline sensor for a motorcycle comprising a case mounted on a body of a motorcycle, a weight being mounted in the case in such a manner as to freely swing in a width direction of the motorcycle, and an incline angle detecting means for detecting the swing of the weight through a predetermined angle, the body incline sensor being characterized by provision of an inclined state transmitting means for transmitting an inclined state signal by determining that the body is in an inclined state when the incline angle detecting means detects the weight and a state so detected continues over a predetermined length of time.

When the detected state continues over the predetermined length of time, the inclined state signal is transmitted from the inclined state transmitting means by determining that the body is in an inclined state. When the detected state only continues within the predetermined length of time, no inclined state signal is transmitted from the inclined state transmitting means by determining that the body is not in an inclined state.

According to this construction, if the incline angle detecting means does not detect the weight within the predetermined length of time due to inertia force generated when the body rolls, no inclined state signal is transmitted from the inclined state transmitting means. Accordingly, an erroneous detection of the incline of the body of the motorcycle can be prevented, and the accuracy with which the incline of the body is detected can be improved.

In addition, if the incline angle detecting means is constituted by the magnet mounted on the weight and reed switches adapted to be switched on by the magnet, and in the event that the inclined state transmitting means is constituted by a simple electric circuit, the production costs of the body incline sensor can be suppressed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
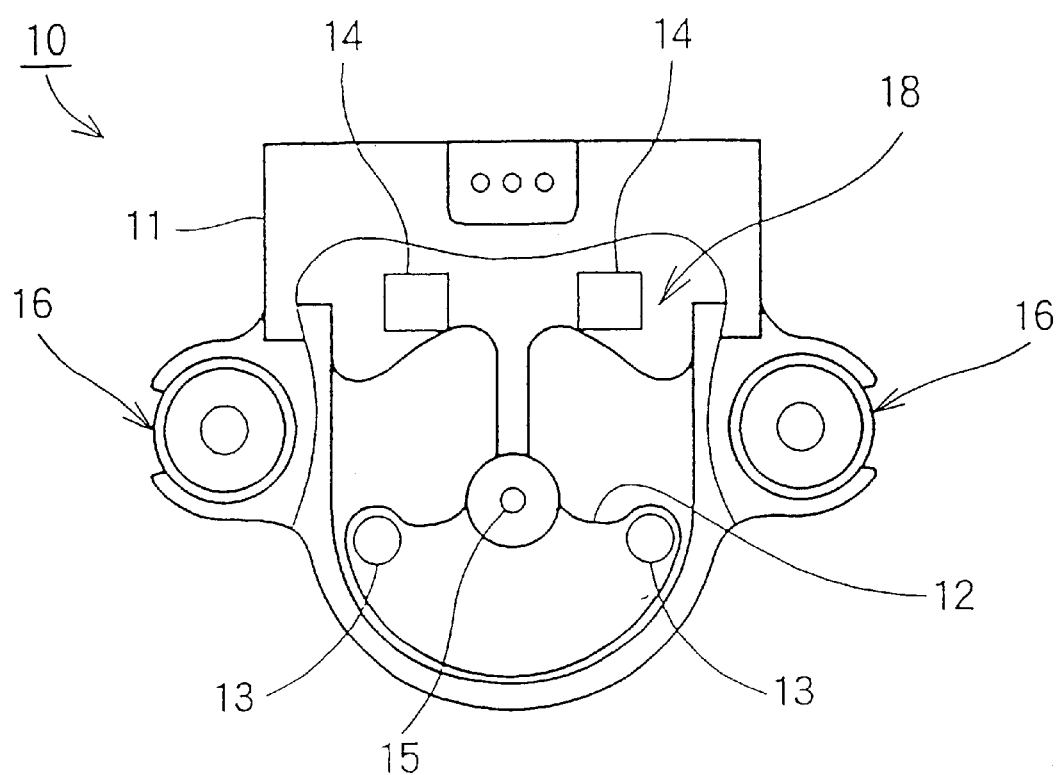
FIG. 1 is a front view of a body incline sensor for a motorcycle according to the present invention.

An embodiment of the present invention will now be described with reference to the accompanying drawings. It should be noted that the drawings are to be viewed in a direction indicated by the orientation of reference numerals.

FIG. 1 is a front view (partially cut away) of a body incline sensor for a motorcycle according to the present invention. A body incline sensor 10 is a sensor that is mounted on the body of a motorcycle for detecting the incline of the body in a width (transverse) direction of the body. The body incline sensor 10 comprises a case 11, a fan-shaped weight 12 suspended within the case in such a manner as to freely swing, magnets 13, 13 mounted at left and right ends of the weight 12 and reed switches 14, 14 mounted: within the case 11 in such a manner as to be switched on when the magnets 13, 13 approach the switches, respectively. It should be noted that reference numeral 15 denotes a swing shaft, which constitutes an axis around which the weight 12 swings, and reference numerals 16, 16 denote body mounting portions where the body incline sensor 10 is mounted on the body of the motorcycle.

When the body of the motorcycle is inclined, the weight 12 remains suspended within the case 11 and moves slightly in the direction of inclination. Accordingly, the case 11 mounted on the body is inclined, and the incline of the body is detected by means of the reed switch 14 which approaches a respective of the magnets 13, 13.

The magnets 13, 13 and reed switches 14, 14 constitute an incline angle detecting means 18.

Since the aforesaid weight 12 is only suspended on the swing shaft 15 within the case 11, for example, in a case where the motorcycle is travelling on a winding road, the weight 12 itself may be tilted by virtue of an inertia force acting on the weight 12. If this occurs, it is considered that the incline of the body of the motorcycle is erroneously detected from the tilt of the weight 12.

Figure 2:
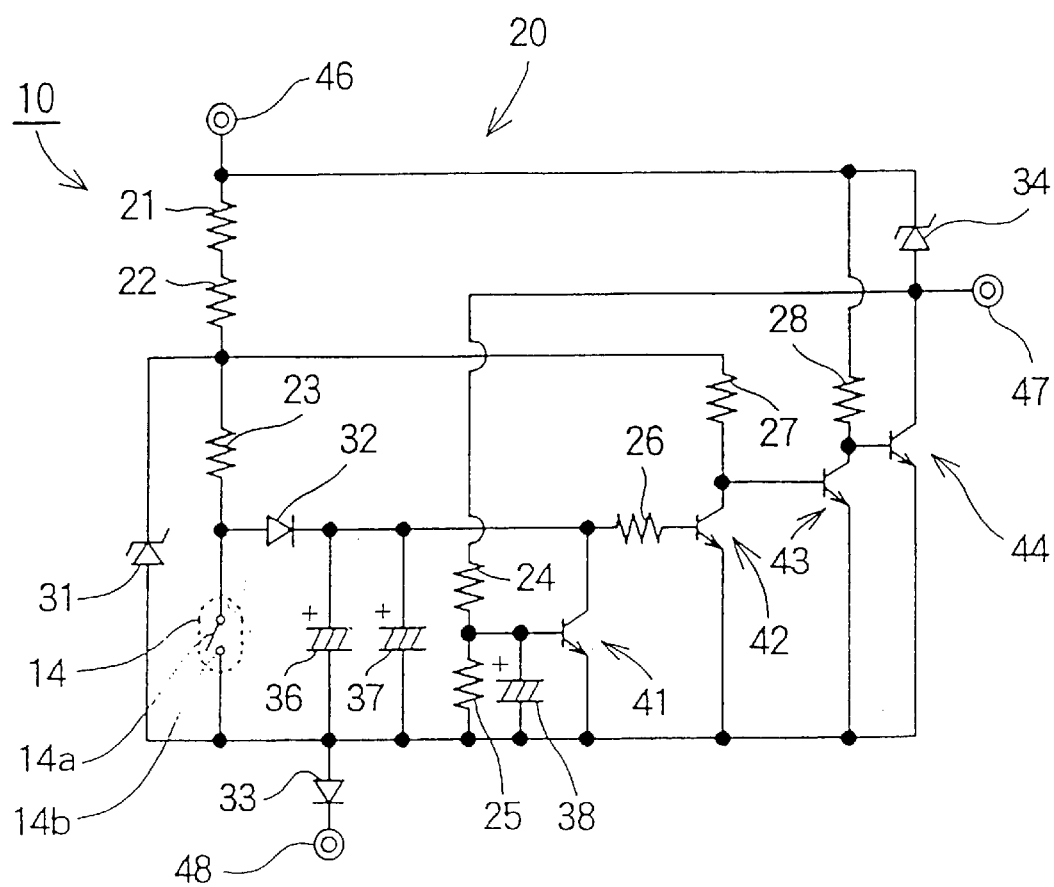
FIG. 2 is a circuit diagram of an erroneous detection preventing circuit of the body incline sensor according to the present invention.

In order to prevent such an erroneous detection, an erroneous detection preventing circuit such as shown in FIG. 2 is provided on the body incline sensor 10 according to the present invention.

FIG. 2 is a circuit diagram showing an erroneous detection preventing circuit for the body incline sensor according to the present invention. An erroneous detection preventing circuit 20 acting as an inclined state transmitting means of the body incline sensor 10 comprises resistances 21 to 28, diodes 31 to 34, electrostatic capacitors 36 to 38 and transistors 41 to 44. It should be noted that reference numeral 14a denotes a movable contact of the reed switch 14, 14b denoting a stationary contact of the reed switch 14, and 46 to 48 denoting connecting terminals.

Figure 3:
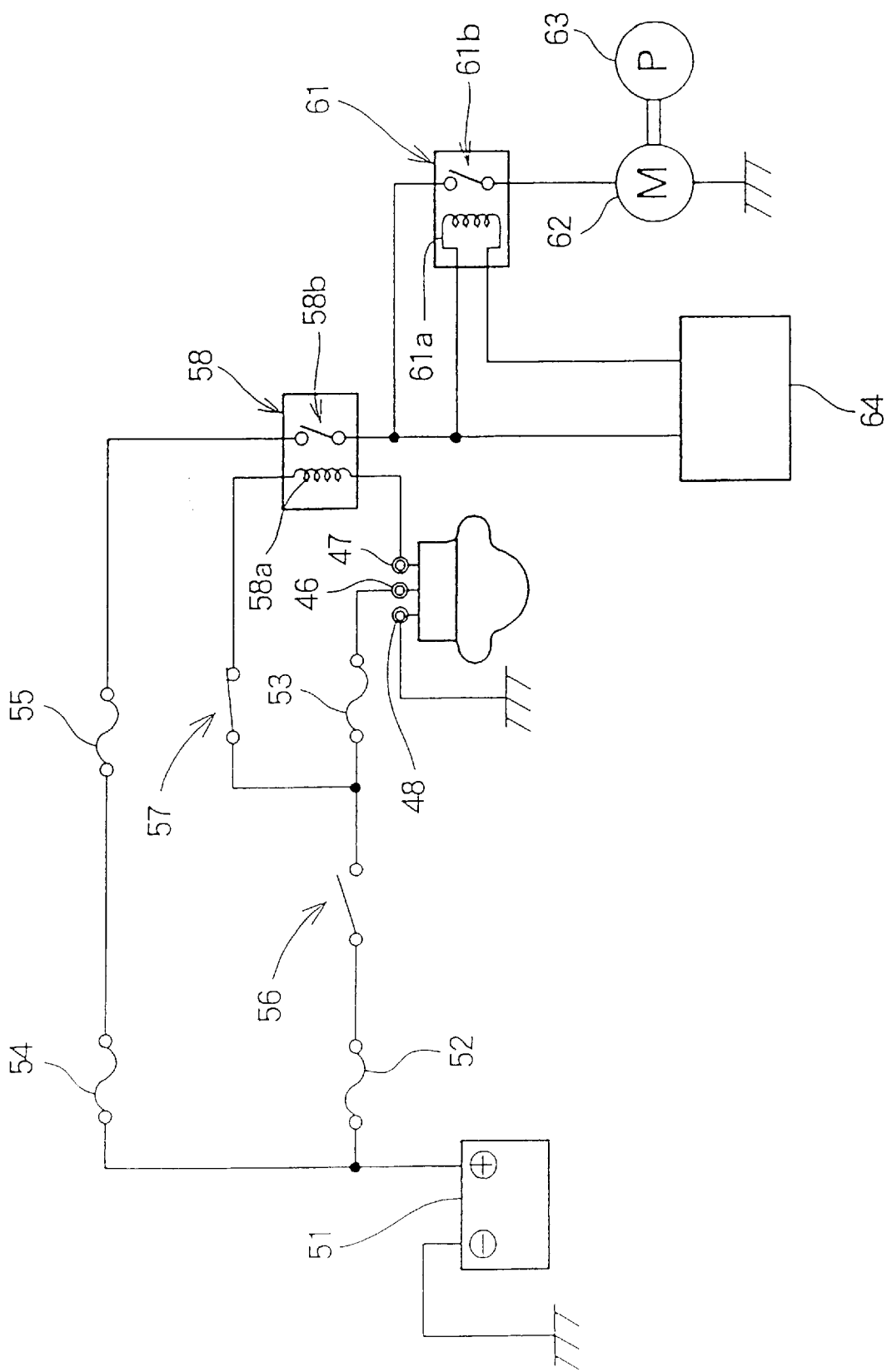
FIG. 3 is a circuit diagram of an electric circuit on a body of a motorcycle to which the body incline sensor according to the present invention is connected.

FIG. 3 is a circuit diagram of an electric circuit on a body of the motorcycle to which the body incline sensor according to the invention is connected.

In FIG. 3, reference numeral 51 denotes a battery, 52 to 55 denote fuses, 56 a main switch, 57 a kill switch, 58 a kill relay, 58a a coil portion of the kill relay 58, 58b a switch portion of the kill relay 58, 61 a fuel-cut relay, 61a a coil portion of the fuel-cut relay 61, 61b a switch portion of the fuel-cut relay 61, 62 a motor, 63 a fuel pump, and 64 an engine control unit.

The body incline sensor 10 is configured such that the connecting terminal 46 is connected to one end of the fuse 53, the connecting terminal 47 is connected to the coil portion 58a of the kill relay 58, and the connecting terminal 48 is grounded.

The kill switch 57 is normally switched on. However, if an emergency condition occurs while the engine is running, the kill switch 57 is switched off manually so that the engine is forced to stop.

The kill relay 58 is adapted to be turned on and/or off through an operation of the kill switch 57 and an operation of the body incline sensor 10. The fuel-cut relay 61 is adapted to be turned on and/or off through an operation of the kill relay 58.

If the kill switch 57 is in an ON state and a conductive state is established between the connecting terminals 47, 48 of the body incline sensor 10, electric current flows through the coil portion 58a of the kill relay 58, whereby the switch portion 58b is turned on.

When the switch portion 58b is turned on, electric current flows through the coil portion 61a of the fuel-cut relay 61, whereby the switch portion 61b is then turned on.

The operation of the body incline sensor 10 described above will now be described.

Figure 4B:
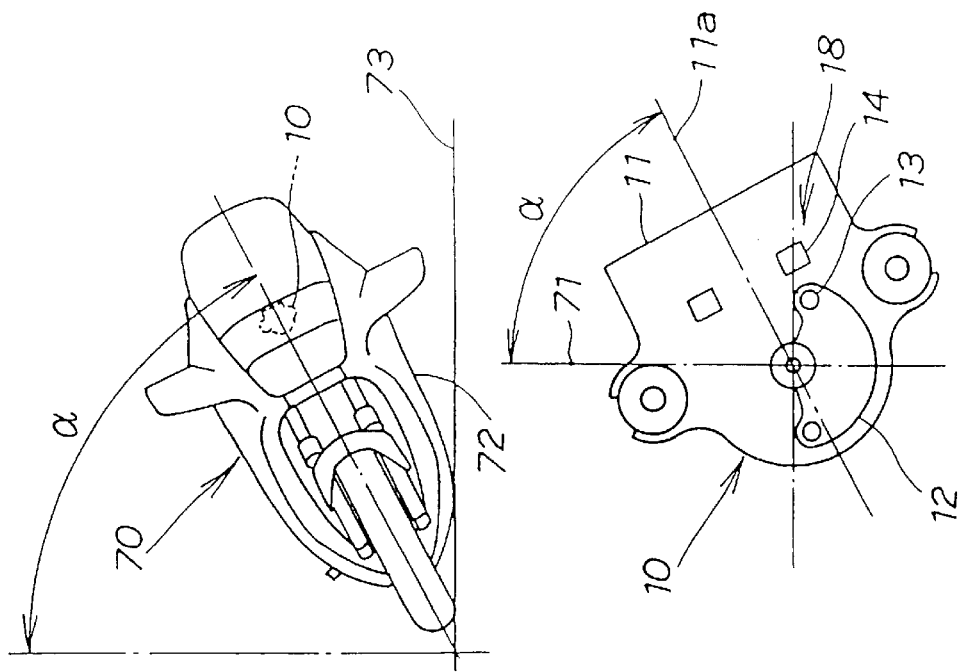
FIGS. 4(*a*) and 4(*b*) are a first operation diagram explaining an operation of the body incline sensor according to the present invention.
Figure 4A:
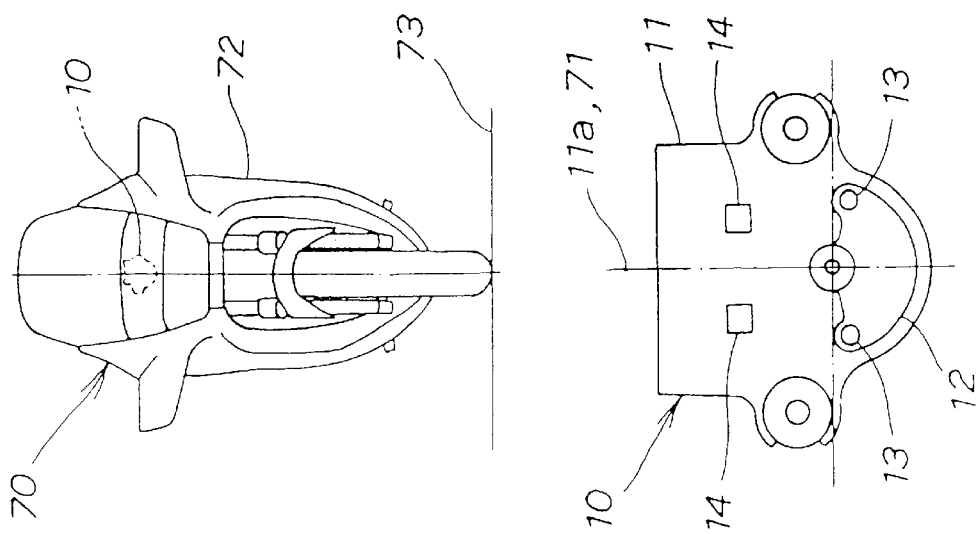

FIGS. 4(a) and 4(b) are a first operation diagram explaining an operation of the body incline sensor according to the present invention. The upper diagrams illustrate a motorcycle 70, whereas lower diagrams illustrate the body incline sensor 10, which is mounted on the motorcycle 70.

FIG. 4(a) illustrates a state in which the motorcycle 70 stands vertically. If this occurs, the center line 11a of the case 11 of the body incline sensor 10 overlaps a vertical line 71.

In FIG. 4(b), when the motorcycle 70 is inclined through an angle a from the state shown in FIG. 4(a), and reaches a state in which the motorcycle 70 rolls over with a cowling 72 of the motorcycle 70 being in contact with the ground, the center line 11a of the case 11 of the body incline sensor 10 inclines through the angle α relative to the vertical line 71.

Since the weight 12 is almost stationary, the reed switch 14 and the magnet 13 mounted on the weight approach each other, whereby the reed switch 14 is switched on.

Figure 5A:
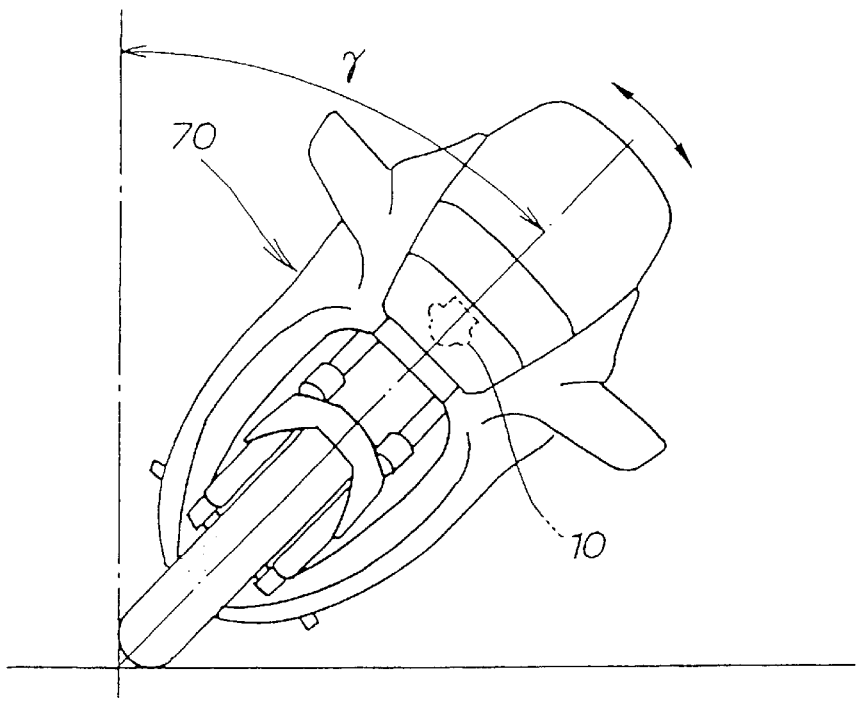
FIGS. 5(*a*) and 5(*b*) are a second operation diagram explaining an operation of the body incline sensor according to the present invention.
Figure 5B:
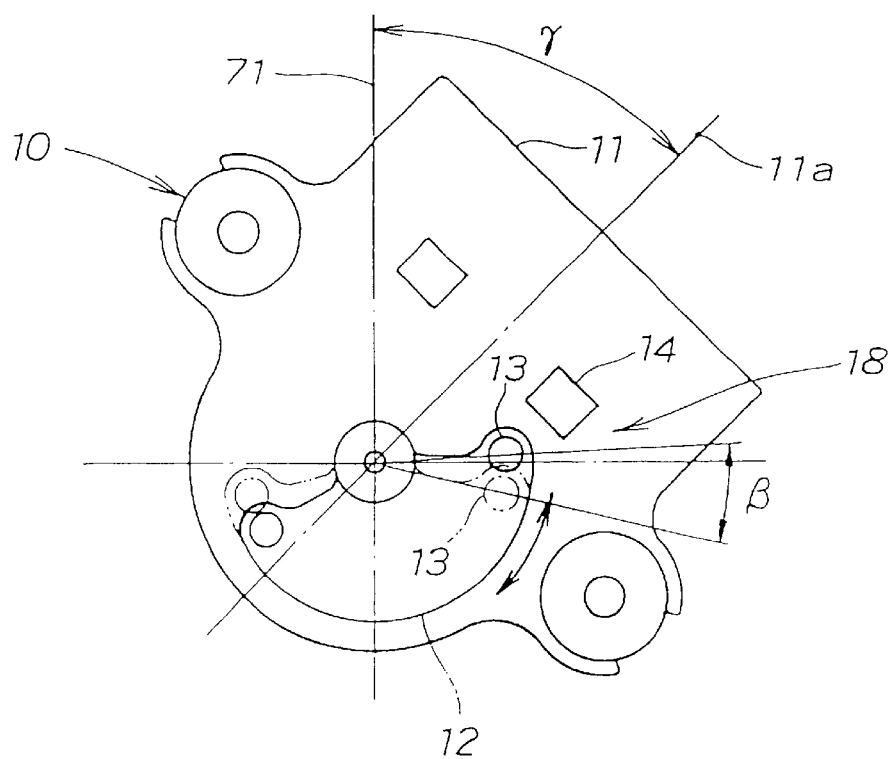

FIGS. 5(a) and 5(b) are a second operation diagram explaining another operation of the body incline sensor 10 according to the invention. FIG. 5(a) illustrates the motorcycle 70, whereas FIG. 5(b) illustrates the body incline sensor 10.

In FIG. 5(a), for example, while the motorcycle 70 is travelling along a winding road or slaloming, the body rolls transversely. Accordingly, in FIG. 5(b), the weight 12 of the body incline sensor 10 swings, and the magnet 13 approaches the reed switch 14 side by an angle β relative to a stationary position of the magnet 13, whereby the reed switch 14 may be switched on. If this occurs, the incline angle γ of the case 11, i.e., the incline angle γ of the body is smaller than the incline angle α (refer to FIG. 4(b) of the body resulting when the body rolls over.

Figure 6:
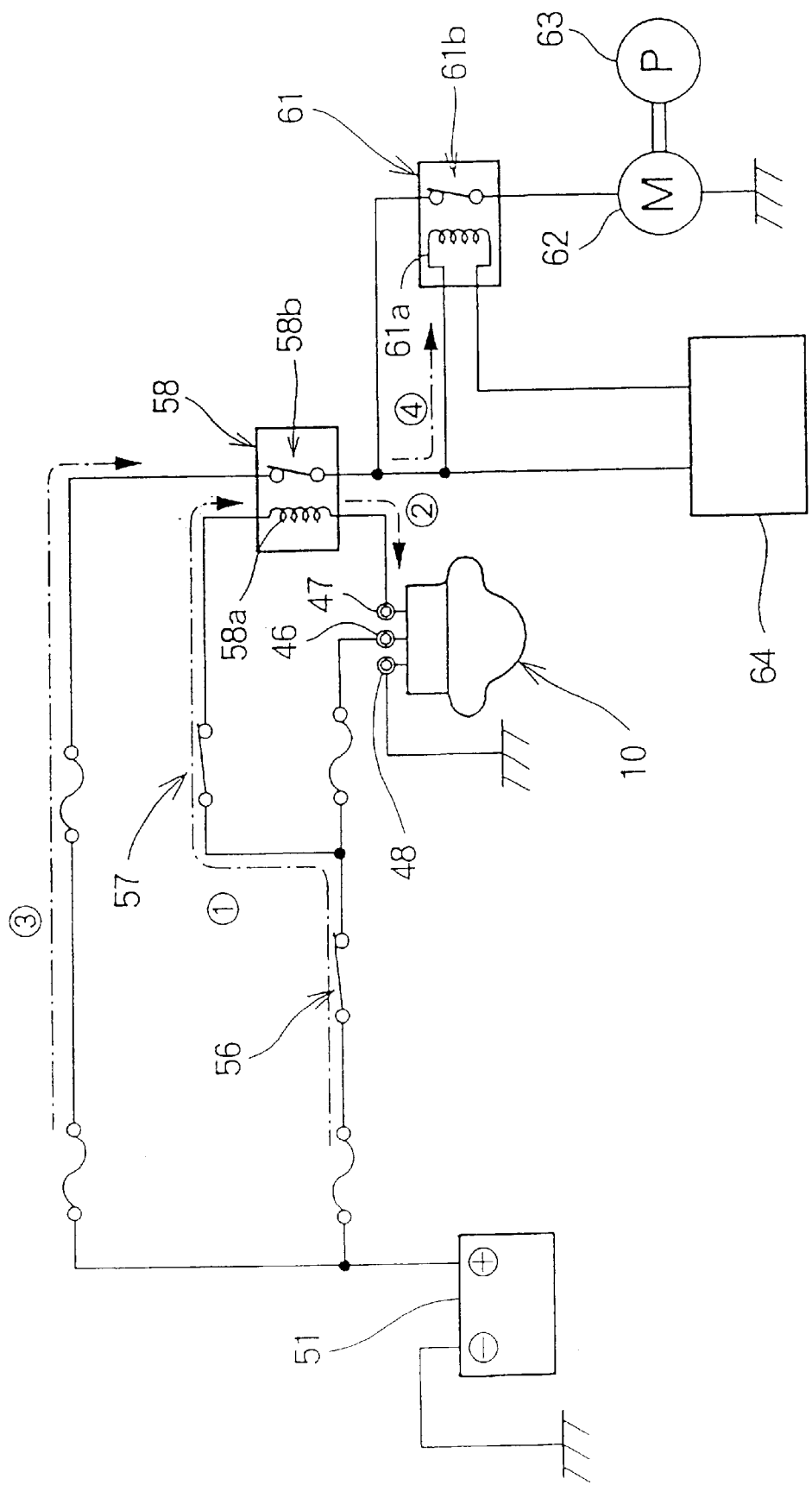
FIG. 6 is a first operation diagram explaining an operation of the electric circuit on the body of the motorcycle to which the body incline sensor according to the present invention is connected.

FIG. 6 is a first operation diagram explaining an operation of the electric circuit on the body of the motorcycle to which the body incline sensor according to the invention is connected.

When a main switch 56 of the motorcycle is switched on, electric current flows to the body incline sensor 10 as indicated by an arrow ② after passing through the kill switch 57 as indicated by an arrow ①, as well as the coil portion 58a of the kill relay 58 (the details will be described in FIG. 7). As this occurs, the switch portion 58b of the kill relay 58 is switched on, and electric current flows as indicated by an arrow ③ and an arrow ④ to reach the coil portion 61a of the fuel-cut relay 61.

This switches on the switch portion 61b of the fuel-cut relay 61 and electric current flows to the motor 62 so that the motor is activated, whereby the fuel pump 63 is in turn activated to supply fuel to the engine.

At the same time as this occurs, a starter motor, not shown, rotates, and fuel injection valves, not shown, are activated by signals from the engine control unit 64, whereby spark plugs, not shown, are ignited to thereby start up the engine.

Figure 7:
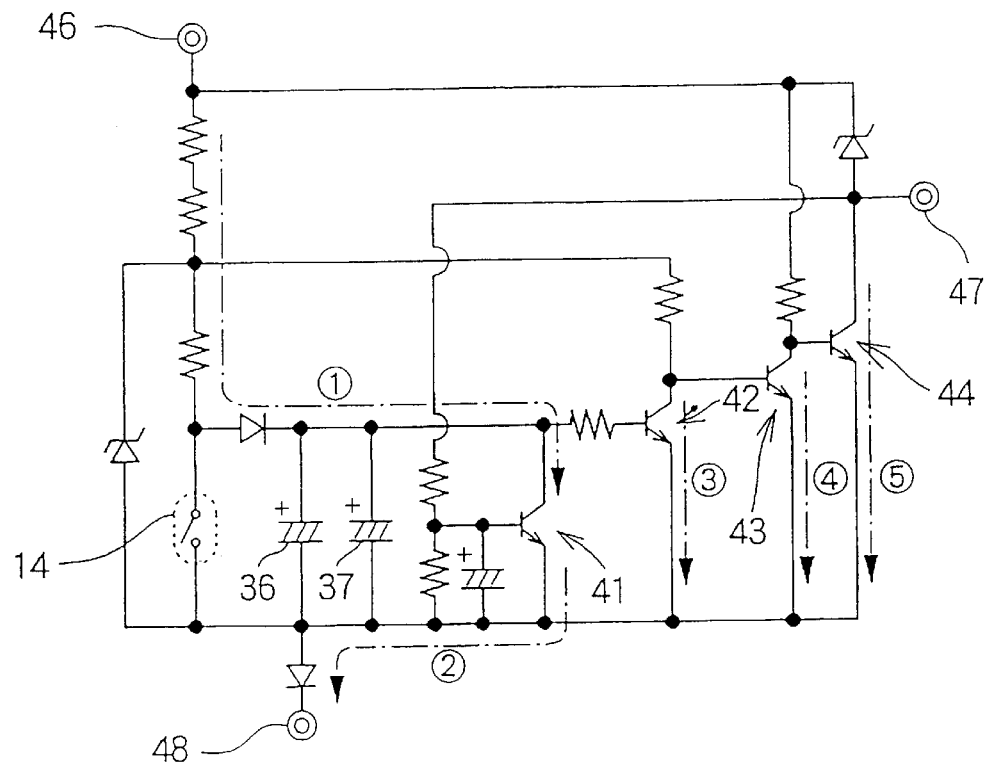
FIG. 7 is a first operation diagram explaining an operation of the erroneous detection preventing circuit of the body incline sensor according to the present invention.

FIG. 7 is a first operation diagram explaining an operation of the erroneous detection preventing circuit for the body incline sensor according to the present invention.

The main switch 56 is switched on in FIG. 6, since, in FIG. 7, voltage is applied to a base of the transistor 41 via the connecting terminal 47, electric current flows from the connecting terminal 46 as indicted by an arrow ① and then flows from the transistor 41 to the connecting terminal 48 as indicated by an arrow ②.

Since this allows electric current to flow through the transistors 42, 43, and 44 in that order as indicated by arrows ③, ④, and ⑤, in FIG. 6, electric current flows as indicated by an arrow ② from the kill relay 58 side to the body incline sensor 10.

Figure 8:
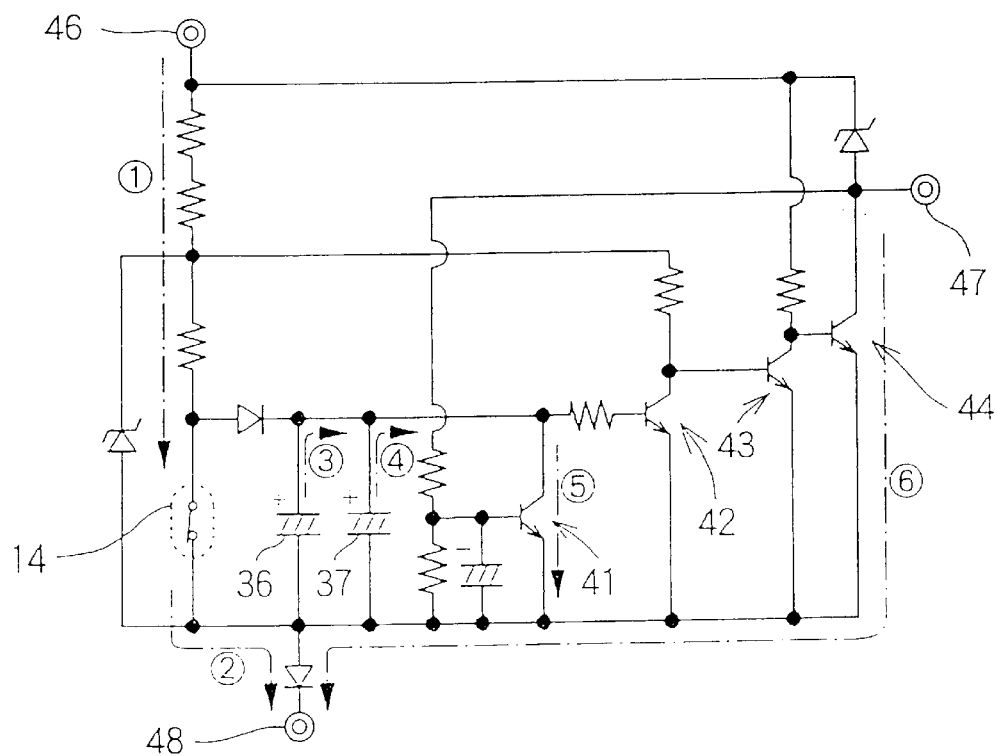
FIG. 8 is a second operation diagram explaining an operation of the erroneous detection preventing circuit of the body incline sensor according to the present invention.

FIG. 8 is a second operation diagram explaining an operation of the erroneous detection preventing circuit for the body incline sensor according to the present invention.

If the motorcycle 70 rolls over as shown in FIG. 4(b), the reed switch 14 in FIG. 8 is switched on.

This allows electric current to flow as indicated by an arrow ① from the connecting terminal 46 side, pass through the reed switch 14 and reach the connecting terminal 48 as indicated by an arrow ②.

As this occurs, in a state in which voltage is applied to the base of the transistor 41, in FIG. 7, while electric current flows as indicated by an arrow ①, since, in FIG. 8, electric current flows as indicated by arrows ③, ④ for a predetermined length of time, for example, 1 to 2 seconds, electric current flows to the transistor 41 as indicated by an arrow ⑤.

This allows electric current to finally flow as indicated by an arrow ⑥ from the connecting terminal 47 side to the connecting terminal 48 side via the transistor 44.

When discharge from the electrostatic capacitors 36, 37 for a predetermined length of time is completed, since no electric current flows to the transistor 41, no electric current flows from the connecting terminal 47 side to the connecting terminal 48 side.

Figure 9:
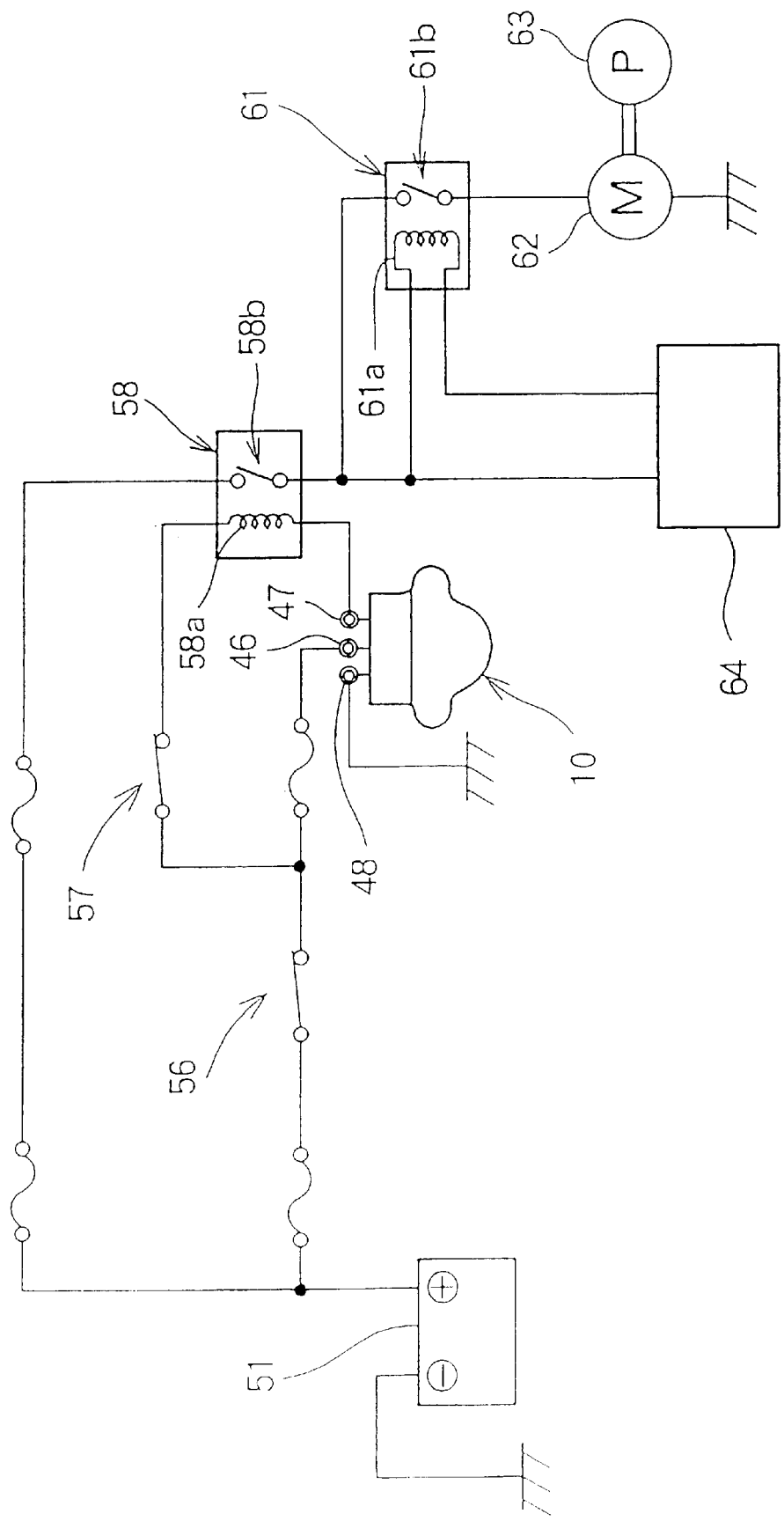
FIG. 9 is a second operation diagram explaining an operation of the electric circuit on the body of the motorcycle to which the body incline sensor according to the present invention is connected.

FIG. 9 is a second operation diagram explaining an operation of the electric circuit on the body of the motorcycle to which the body incline sensor according to the present invention is connected.

When no electric current flows from the connecting terminal 47 side to the connecting terminal 48 side, since no electric current flows to the coil portion 58a of the kill relay 58, the switch portion 58 turns off, whereby no electric current flows to the coil portion 61a of the fuel-cut relay 61, and the switch portion 61b turns off. As a result, no current flows to the motor 62, whereby the fuel pump 63 stops.

At the same time as this occurs, the fuel injection valves become inactive by a signal from the engine control unit 64, and since no spark plugs are ignited, the engine stops.

In addition, as was described in FIGS. 5(a) and 5(b), in the event that the reed switch 14 of the body incline sensor 10 is switched on at the incline angle γ which is smaller than the incline angle α of the body resulting when the body is rolling, since the length of time during which the reed switch 14 is kept on is short, the reed switch 14 turns off within the predetermined length of time during which the electrostatic capacitors 36, 37 are discharged. Since electric current starts to flow again as indicated by the arrow ① shown in FIG. 8, the flow of electric current between the connecting terminals 47, 48 can be maintained.

Consequently, the fuel pump 63 can continue to operate as was described in FIG. 6, whereby no risk of the engine stopping occurs.

As was described in FIGS. 1 and 2, the present invention provides the body incline sensor 10 for a motorcycle 70 (refer to FIG. 4(a)) comprising the case 11 mounted on the body of the motorcycle 70, the weight 12 being mounted in the case in such a manner as to freely swing in the width direction of the motorcycle, and the incline angle detecting means 18 for detecting the swing of the weight 12 through the predetermined angle, the body incline sensor 10 being characterized by provision of the erroneous detection preventing circuit 20 for transmitting the inclined state signal by determining that the body is in the inclined state when the incline angle detecting means 18 detects the weight 12 and the state so detected continues over the predetermined length of time.

Namely, the body incline sensor 10 comprises the erroneous detection preventing circuit 20 for cutting-off electric current between the connecting terminals by flowing electric current such as indicated by the arrow ① and terminating discharge of the electrostatic capacitors 36, 37, i.e., "for transmitting the inclined state signal" by determining that the body is in the inclined state when the incline angle detecting means 18 detects the weight 12 in FIG. 4(b), electric current such as indicated by the arrows ①, ② flows in FIG. 8, electric current such as indicated by the arrows ③, ④ flows from the electrostatic capacitors 36, 37, and the detected state continues over the predetermined length of time, i.e., the discharging time of the electrostatic capacitors 36, 37.

With the above construction of the body incline sensor 10, in the event that the incline angle detecting means 18 does not detect the weight 12 within the predetermined length of time due to the inertia force resulting when the body is rolling, no inclined state signal is transmitted from the erroneous detection preventing circuit 20. Accordingly, in FIG. 7, electric current is allowed to flow between the connecting terminals 47, 48 by allowing electric current to flow as indicated by the arrow ① to thereby prevent the erroneous detection of the incline of the body. Therefore, the accuracy with which the incline of the body is detected is improved.

In addition, if the incline angle detecting means 18 is constituted by the magnets 13 mounted on the weight 12 and the reed switches 14 adapted to be switched on by the magnets 13, and in the event that the erroneous detecting preventing circuit 20 is constituted by the simple electric circuit, the production costs of the body incline sensor 10 can be suppressed.

It should be noted that while the inclined state transmitting means of the present invention comprises the electrostatic capacitors in order to set the predetermined length of time, the present invention is not limited to the use of the electrostatic capacitors. For example, a timer can be used to set the predetermined length of time.

Furthermore, while the incline angle detecting means of the present invention is constituted by the magnets and the reed switches, the present invention is not limited to the use of the magnets and reed switches. For example, a combination of a magnetic body utilizing electromagnetic induction and a coil or a combination of two electrodes which can vary an interval for utilizing variation in electrostatic capacity can be used.

With the construction described heretofore, the present invention exhibits the following advantages.

Since the body incline sensor for a motorcycle as set forth in the first aspect of the present invention comprises the inclined state transmitting means for transmitting an inclined state signal by determining that the body is in the inclined state when the incline angle detecting means detects the weight and the state so detected continues over the predetermined length of time, in the event that the incline angle detecting means does not detect the weight within the predetermined length of time due to the inertia force resulting when the body is rolling, no inclined state signal is transmitted from the inclined state transmitting means, whereby the erroneous detection of the incline of the body can be prevented, the accuracy with which the incline of the body is detected being thus improved.

In addition, in the event that the incline angle detecting means is constituted by the magnets mounted on the weight and the reed switches adapted to be switched on by the magnets, and in the event that the inclined state transmitting means is constituted by the simple electric circuit, the production costs of the body incline sensor can be suppressed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A body incline sensor for a vehicle, comprising:
   a case mountable on a body of the vehicle;
   a weight mounted in said case in such a manner as to freely swing in a width direction of the vehicle;
   incline angle detecting means for detecting the swing of said weight through a predetermined angle; and
   inclined state transmitting means for transmitting an inclined state signal when it is determined that the body of the vehicle is in an inclined state from said incline angle detecting means detecting said weight, and the inclined state continues over a predetermined length of time, said inclined state transmitting means including a first electric connecting terminal for receiving the inclined state signal, and a second electric connecting terminal connected to a kill switch and a kill relay, said kill relay for controlling electric power supply to components of said vehicle,
   wherein a length of time said vehicle is in the inclined state is measured by using electrostatic capacitors.

2. The body incline sensor for a vehicle according to claim 1, wherein when the inclined state detected by said incline angle detecting means only continues for less than the predetermined length of time, said inclined state transmitting means does not transmit an inclined state signal.

3. The body incline sensor for a vehicle according to claim 2, wherein said incline angle detecting means comprises a pair of magnets mounted on opposite sides of said weight, and a pair of reed switches mounted on opposite sides of said case corresponding to respective of said pair of magnets, wherein when said weight swings in first and second directions due to inclination of said body, the pair of magnets operate said pair of reed switches, respectively, to detect the incline angle of the body.

4. The body incline sensor for a vehicle according to claim 2 in combination with the vehicle, wherein the vehicle comprises:
   a motor;
   an engine control unit; and
   circuit means connected to said inclined state transmitting means, said motor and said engine control unit,
   wherein when said inclined state transmitting means transmits an inclined state signal to said circuit means, said circuit means stops supply of current to said motor and prevents operation of said engine control unit, and wherein when said inclined state transmitting means does not transmit an inclined state signal to said circuit means, said circuit means supplies current to said motor and allows operation of said engine control unit.

5. The body incline sensor for a vehicle according to claim 1, wherein said incline angle detecting means comprises a pair of magnets mounted on opposite sides of said weight, and a pair of reed switches mounted on opposite sides of said case corresponding to respective of said pair of magnets, wherein when said weight swings in first and second directions due to inclination of said body, the pair of magnets operate said pair of reed switches, respectively, to detect the incline angle of the body.

6. The body incline sensor for a vehicle according to claim 1 in combination with the vehicle, wherein the vehicle comprises:
   a motor;
   an engine control unit; and
   circuit means connected to said inclined state transmitting means, said motor and said engine control unit,
   wherein when said inclined state transmitting means transmits an inclined state signal to said circuit means, said circuit means stops supply of current to said motor and prevents operation of said engine control unit.

7. The body incline sensor for a vehicle according to claim 1, wherein said inclined state transmitter comprises an erroneous detection preventing circuit, said erroneous detection preventing circuit comprising:
   at least one resistance;
   at least one diode; and
   at least one transistor,
   wherein said inclined state transmitter transmits an inclined state signal when said at least one electrostatic capacitor is discharged.

8. The body incline sensor for a vehicle according to claim 1, wherein said weight is mounted to swing in only the width direction of the vehicle.

9. A body incline sensor for a vehicle, comprising:
   a case mountable on a body of the vehicle;
   a weight mounted in said case in such a manner as to freely swing in a width direction of the vehicle;
   an incline angle detector, said incline angle detector detecting the swing of said weight through a predetermined angle; and an inclined state transmitter, said inclined state transmitter transmitting an inclined state signal when it is determined that the body of the vehicle is in an inclined state from said incline angle detector detecting said weight, and the inclined state continues over a predetermined length of time, said inclined state transmitter including a first electric connecting terminal for receiving the inclined state signal, and a second electric connecting terminal connected to a kill switch and a kill relay, said kill relay for controlling electric power supply to components of said vehicle, wherein a length of time said vehicle is in the inclined state is measured by using electrostatic capacitors.

10. The body incline sensor for a vehicle according to claim 9, wherein when the inclined state detected by said incline angle detector only continues for less than the predetermined length of time, said inclined state transmitter does not transmit an inclined state signal.

11. The body incline sensor for a vehicle according to claim 10, wherein said incline angle detector comprises a pair of magnets mounted on opposite sides of said weight, and a pair of reed switches mounted on opposite sides of said case corresponding to respective of said pair of magnets, wherein when said weight swings in first and second directions due to inclination of said body, the pair of magnets operate said pair of reed switches, respectively, to detect the incline angle of the body.

12. The body incline sensor for a vehicle according to claim 10 in combination with the vehicle, wherein the vehicle comprises:
a motor;
an engine control unit; and
a circuit connected to said inclined state transmitter, said motor and said engine control unit,
wherein when said inclined state transmitter transmits an inclined state signal to said circuit, said circuit stops supply of current to said motor and prevents operation of said engine control unit, and wherein when said inclined state transmitter does not transmit an inclined state signal to said circuit, said circuit supplies current to said motor and allows operation of said engine control unit.

13. The body incline sensor for a vehicle according to claim 9, wherein said incline angle detector comprises a pair of magnets mounted on opposite sides of said weight, and a pair of reed switches mounted on opposite sides of said case corresponding to respective of said pair of magnets, wherein when said weight swings in first and second directions due to inclination of said body, the pair of magnets operate said pair of reed switches, respectively, to detect the incline angle of the body.

14. The body incline sensor for a vehicle according to claim 9 in combination with the vehicle, wherein the vehicle comprises:
a motor;
an engine control unit; and
a circuit connected to said inclined state transmitter, said motor and said engine control unit,
wherein when said inclined state transmitter transmits an inclined state signal to said circuit, said circuit stops supply of current to said motor and prevents operation of said engine control unit.

15. The body incline sensor for a vehicle according to claim 9, wherein said inclined state transmitter comprises an erroneous detection preventing circuit, said erroneous detection preventing circuit comprising:

at least one resistance;
at least one diode; and
at least one transistor,
wherein said inclined state transmitter transmits an inclined state signal when said at least one electrostatic capacitor is discharged.

16. The body incline sensor for a vehicle according to claim 9, wherein said weight is mounted to swing in only the width direction of the vehicle.

17. A method of detecting the incline of a vehicle, comprising the steps of:
mounting a body incline sensor on a body of the vehicle, the body incline sensor including a case, a weight mounted in said case in such a manner as to freely swing in a width direction of the vehicle, an incline angle detector, and an inclined state transmitter, said inclined state transmitter including a first electric connecting terminal for receiving an inclined state signal from said incline angle detector, and a second electric connecting terminal connected to a kill switch and a kill relay, said kill relay for controlling electric power supply to components of said vehicle;
detecting the swing of said weight through a predetermined angle with said incline angle detector; and
transmitting an inclined state signal with said inclined state transmitter when it is determined that the body of the vehicle is in an inclined state from said incline angle detector detecting said weight, and the inclined state continues over a predetermined length of time,
wherein the step of detecting includes a step of measuring a length of time the vehicle is in the inclined state by using electrostatic capacitors.

18. The method of detecting the incline of a vehicle according to claim 17, further comprising the step of not transmitting an inclined state with said inclined state transmitter when the inclined state detected by said incline angle detector only continues for less than the predetermined length of time.

19. The method of detecting the incline of a vehicle according to claim 18, wherein said incline angle detector comprises a pair of magnets mounted on opposite sides of said weight, and a pair of reed switches mounted on opposite sides of said case corresponding to respective of said pair of magnets, said method comprising the step of detecting the incline angle of the body when said weight swings in first and second directions due to inclination of said body, and said pair of magnets operate said pair of reed switches, respectively.

20. The method of detecting the incline of a vehicle according to claim 17, wherein said incline angle detector comprises a pair of magnets mounted on opposite sides of said weight, and a pair of reed switches mounted on opposite sides of said case corresponding to respective of said pair of magnets, said method comprising the step of detecting the incline angle of the body when said weight swings in first and second directions due to inclination of said body, and said pair of magnets operate said pair of reed switches, respectively.

21. The method of detecting the incline of a vehicle according to claim 17, wherein said inclined state transmitter comprises an erroneous detection preventing circuit, said erroneous detection preventing circuit comprising:
at least one resistance;
at least one diode;
at least one electrostatic capacitor; and at least one transistor, said method further comprising the step of transmitting an inclined state signal when said at least one electrostatic capacitor is discharged.

22. The method of detecting the incline of a vehicle according to claim 17, wherein said step of mounting includes the step of mounting the weight to swing only in the width direction of the vehicle.

23. A body incline sensor for a vehicle, comprising:

a case mountable on a body of the vehicle;

a weight mounted in said case in such a manner as to freely swing in a width direction of the vehicle;

incline angle detecting means for detecting the swing of said weight through a predetermined angle; and inclined state transmitting means for transmitting an inclined state signal when it is determined that the body of the vehicle is in an inclined state from said incline angle detecting means detecting said weight, and the inclined state continues over a predetermined length of time, said inclined state transmitting means including a first electric connecting terminal for receiving the inclined state signal, and a second electric connecting terminal connected to a kill switch and a kill relay, said kill relay for controlling electric power supply to an engine control unit and other components of said vehicle, wherein transmitting the inclined state signal from said inclined state transmitting means causes said electric power supply for said engine control unit and other components to be stopped.

* * * * *